(12) United States Patent
Klindt

(10) Patent No.: US 8,567,173 B1
(45) Date of Patent: Oct. 29, 2013

(54) LINKAGE WEAR PREVENTION DEVICE

(71) Applicant: Neal J. Klindt, Campbell, MN (US)

(72) Inventor: Neal J. Klindt, Campbell, MN (US)

( * ) Notice: Subject to any disclaimer, the term of this patent is extended or adjusted under 35 U.S.C. 154(b) by 0 days.

(21) Appl. No.: 13/756,644

(22) Filed: Feb. 1, 2013

(51) Int. Cl.
*B60C 27/06* (2006.01)
*A44B 1/04* (2006.01)

(52) U.S. Cl.
USPC ............... 59/93; 59/35.1; 152/221; 152/222; 24/114.5; 24/115 A

(58) Field of Classification Search
USPC ............ 59/35.1, 93; 439/266, 442; 428/34.5; 606/151; 152/221, 222; 24/114.5, 24/115 A
See application file for complete search history.

(56) References Cited

U.S. PATENT DOCUMENTS

| | | | |
|---|---|---|---|
| 4,304,454 A * | 12/1981 | Yokota et al. | 439/442 |
| 4,820,561 A * | 4/1989 | Pithouse et al. | 428/34.5 |
| 4,834,666 A * | 5/1989 | Lee | 439/266 |
| 4,963,101 A * | 10/1990 | Lee | 439/266 |
| 5,068,948 A * | 12/1991 | Blankenship et al. | 403/212 |
| 5,140,761 A | 8/1992 | Coffman | |
| 5,299,613 A * | 4/1994 | Maresh | 59/93 |
| 5,916,224 A * | 6/1999 | Esplin | 606/151 |
| 6,662,545 B1 | 12/2003 | Yoshida | |
| 7,467,710 B2 | 12/2008 | Cerwin | |
| 7,546,726 B1 | 6/2009 | Wu | |
| 7,571,595 B2 | 8/2009 | Wettlaufer | |
| 2012/0071059 A1 | 3/2012 | Roethig | |

* cited by examiner

*Primary Examiner* — David B Jones
(74) *Attorney, Agent, or Firm* — Jason L. Gilbert

(57) ABSTRACT

A linkage wear prevention device for preventing or fixing wear in a linkage device such as a chain. The linkage wear prevention device generally includes a clip device having a hollow main body with a channel extending therethrough. The clip device is initially C-shaped, with a slot defined by a first end and a second end. The first and second ends each include projections and indentations which act to fuse together the ends of the clip device. When so fused together, the clip device will take on an O-shaped structure which fully encloses around a damaged portion of a linkage.

12 Claims, 5 Drawing Sheets

LINKAGE WEAR PREVENTION DEVICE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a linkage wear preventer and more specifically it relates to a linkage wear prevention device for preventing or fixing wear in a linkage device such as a chain.

2. Description of the Related Art

Any discussion of the related art throughout the specification should in no way be considered as an admission that such related art is widely known or forms part of common general knowledge in the field.

Linkages such as chains are used in a wide variety of industries for a number of applications. Such linkages are often exposed to significant stress which can cause the linkage to warp, crack, break or otherwise suffer from structural instability. In the past, such damaged linkages have needed to be outright replaced. Replacing such linkages can often be an extremely cumbersome task. Further, the cost of the replacement linkage and/or the tools necessary to remove and replace the linkage can be exhorbitant.

Because of the inherent problems with the related art, there is a need for a new and improved linkage wear prevention device for preventing or fixing wear in a linkage device such as a chain.

BRIEF SUMMARY OF THE INVENTION

The invention generally relates to a linkage wear preventer which includes a clip device having a hollow main body with a channel extending therethrough. The clip device is initially C-shaped, with a slot defined by a first end and a second end. The first and second ends each include projections and indentations which act to fuse together the ends of the clip device. When so fused together, the clip device will take on an O-shaped structure which fully encloses around a damaged portion of a linkage.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
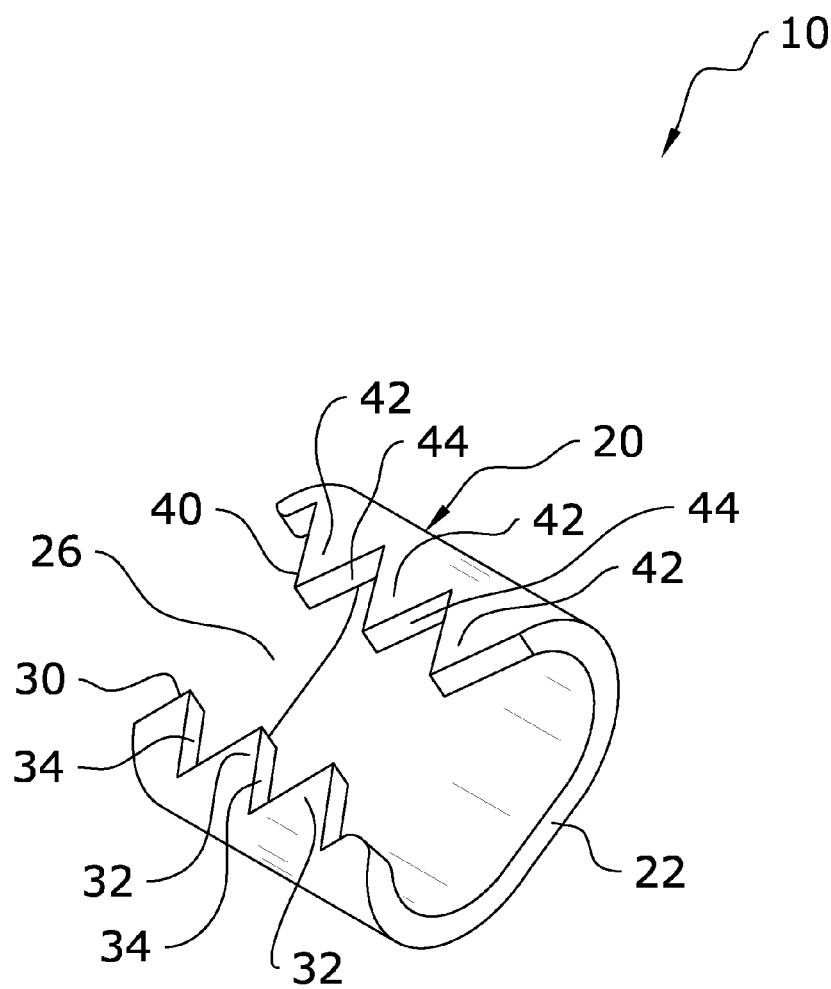
FIG. 1 is an upper perspective view of the present invention in an open state.

A. Overview.

Turning now descriptively to the drawings, in which similar reference characters denote similar elements throughout the several views, FIGS. 1 through 5 illustrate a linkage wear prevention device 10, which comprises a clip device 20 having a hollow main body 22 with a channel 24 extending therethrough. The clip device 20 is initially C-shaped, with a slot 26 defined by a first end 30 and a second end 40. The first and second ends 30, 40 each include projections 32, 42 and indentations 34, 44 which act to fuse together the ends 30, 40 of the clip device 20. When so fused together, the clip device 20 will take on an O-shaped structure which fully encloses around a damaged portion of a linkage 14.

B. Clip Device.

As shown in the figures, the present invention is generally comprised of a clip device 20 which extends over a broken or worn portion of a linkage 14 such as a chain. The clip device 20 includes a main body 22 which surrounds an open channel 24 extending therethrough. The main body 22 is separated by a slot 26 which will be closed when the present invention is applied to a linkage 14.

The clip device 20 itself is generally comprised of a metallic material, such as a metal or metallic alloy. However, various other types of materials may be utilized for different embodiments. It is appreciated that, in some embodiments, the clip device 20 may be comprised of a single material or, in alternate embodiments, the clip device 20 may be comprised of two or more different materials fused together. Further, the clip device 20 may be comprised of composite and/or synthetic materials in some embodiments.

At least the main body 22 of the clip device 20 is preferably comprised of a malleable material such that the clip device 20 may freely be closed without excessive effort. It is important that the clip device 20 not be a fully rigid material which will break under application of such pressure necessary to close the device. Any type of material suitable for allowing the present invention to be closed without cracking or breaking may be utilized with the present invention.

Figure 2:
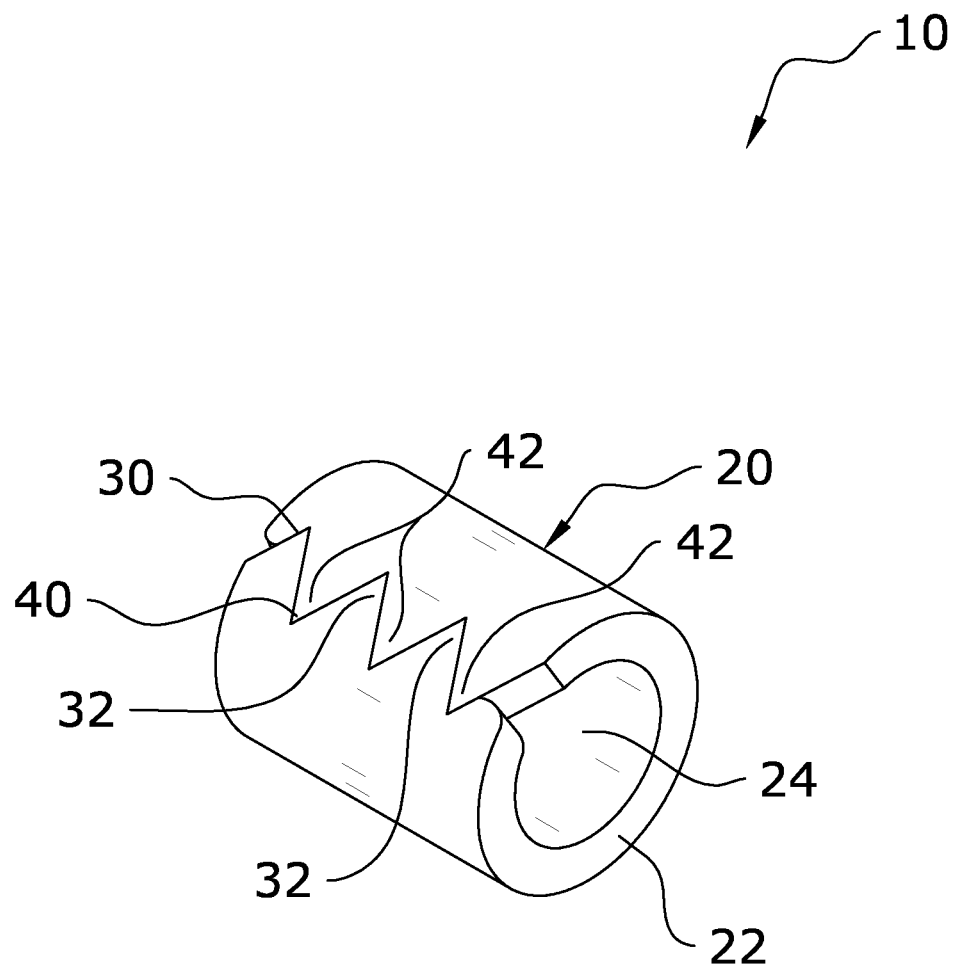
FIG. 2 is an upper perspective view of the present invention in a closed state.

The clip device 20, when in an opened state, includes a first end 30 and a second end 40 which are separated by and serve to define a slot 26 therebetween as shown in FIG. 1. The slot 26 is utilized to position the clip device 20 around the linkage 14 to be repaired. After being secured around the linkage 14, the clip device 20 will be closed by forcing the first and second ends 30, 40 together, thus closing the slot 26 as shown in FIG. 2.

The first end 30 of the clip device 20 generally includes a plurality of first projections 32 and a plurality of first indentations 34 as shown in FIG. 1, with the indentations 34 being defined by the projections 32.

The combination of projections 32 and indentations 34 acts to create a jaw-like structure which will engage with corresponding projections 42 and indentations 44 on the second end 40. The numbering, spacing and shape of the projections 32 and indentations 34 may vary for different applications. Thus, the scope of the present invention should not be construed as being limited by the exemplary configuration shown in the figures.

The second end 40 of the clip device 20, which faces the first end 20 and is separated therefrom by the slot 26, similarly includes a plurality of second projections 42 and a plurality of second indentations 34 as shown in FIG. 1. Like with the first end 30, the numbering, spacing and shape of the projections 32 and indentations 34 may vary for different applications.

When the present invention is closed together, the first projections 32 of the first end 30 will be inserted within and engage with the second indentations 44 of the second end 40. Similarly, the second projections 42 of the second end 40 will be inserted within and engage with the first indentations 34 of the first end 30. Thus, the present invention may be closed together firmly around a linkage 14 such as a chain.

C. Operation of Preferred Embodiment.

Figure 3:
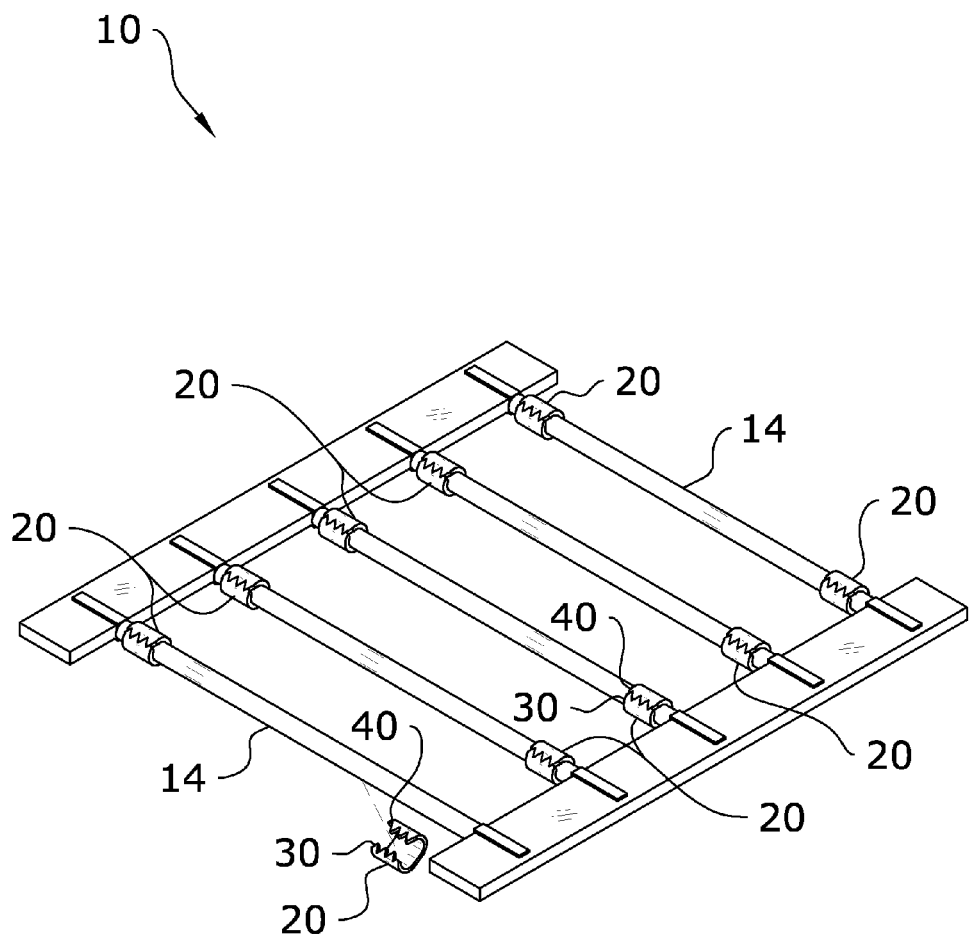
FIG. 3 is an upper perspective view of the present invention in use.

In use, the clip device 20 is first positioned around a linkage 14 such as shown in FIG. 3. The linkage 14 may be inserted into the channel 24 of the clip device 20 by inserting the linkage 14 therein through the slot 26.

Figure 4:
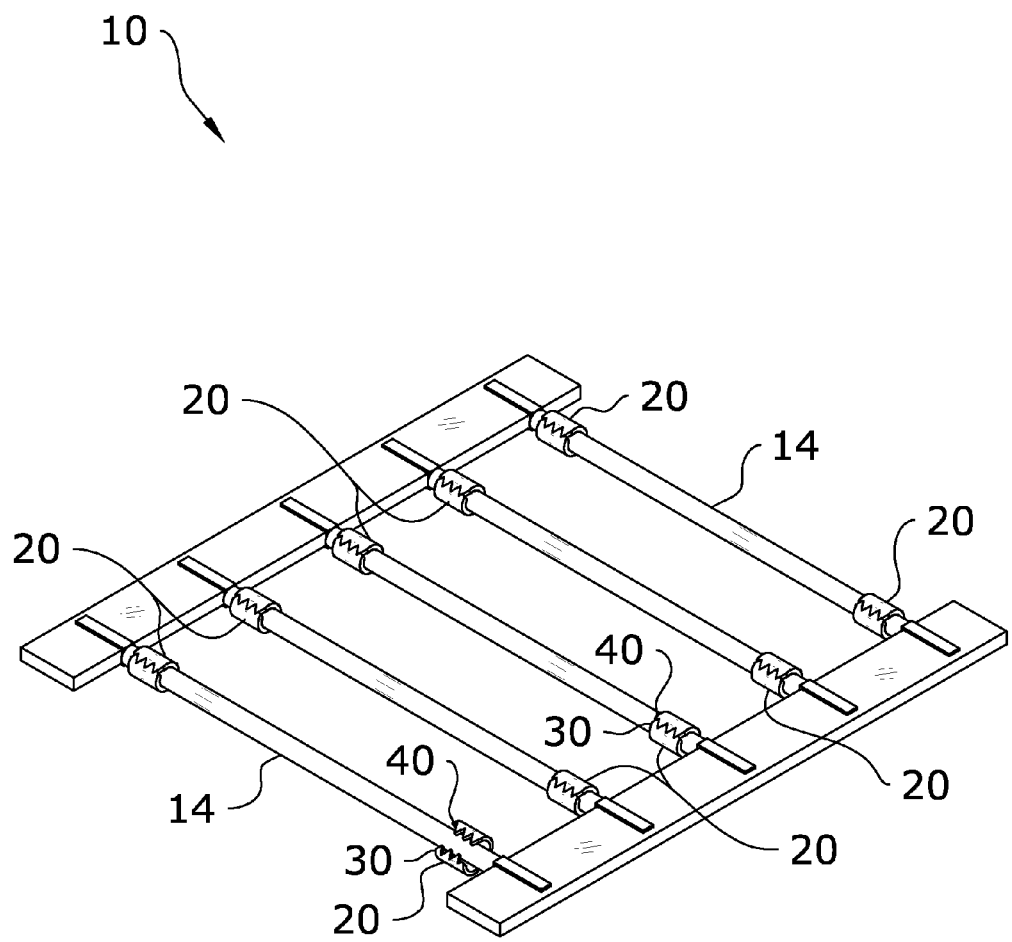
FIG. 4 is an upper perspective view of the clip device of the present invention being positioned around a linkage.
Figure 5:
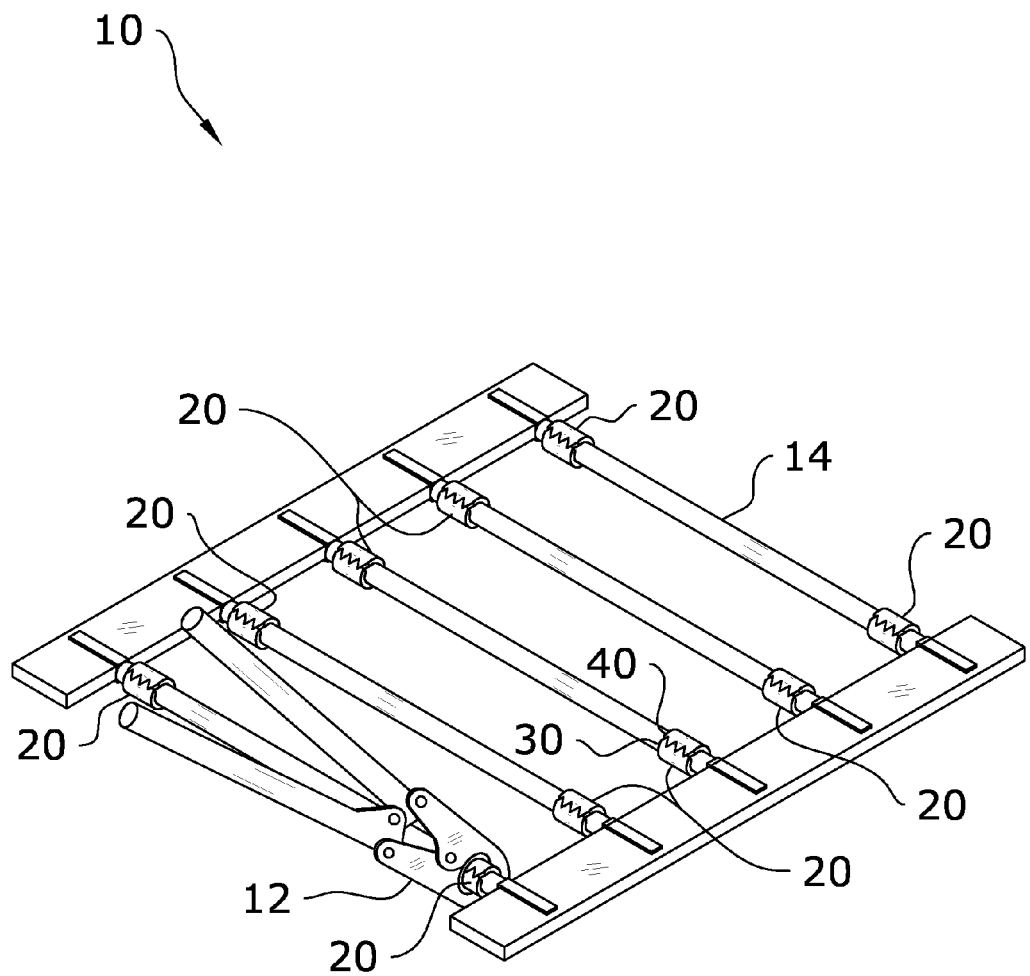
FIG. 5 is an upper perspective view of the clip device of the present invention being tightened around a linkage.

With the clip device 20 positioned around the linkage 14 as shown in FIG. 4, a tightening device 12 such as a wrench or other similar mechanism may be utilized to force the first end 30 and second end 40 of the clip device 20 together. The projections 32, 42 and indentations 34, 44 will engage with each other to close the clip device 20 around the damaged portion of the linkage 14.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A linkage wear prevention system, comprising:
a chain, wherein said chain includes a worn portion;
a clip device removably secured about said worn portion of said chain, said clip device including a first end and a second end, said first end and said second end defining a slot therebetween;
a plurality of first projections positioned on said first end of said clip device, said first projections defining a plurality of first indentations; and
a plurality of second projections positioned on said second end of said clip device, said second projections defining a plurality of second indentations.

2. The linkage wear prevention system of claim 1, further comprising a channel extending through said clip device.

3. The linkage wear prevention system of claim 1, wherein said clip device is comprised of a malleable metal.

4. The linkage wear prevention system of claim 1, wherein said first projections and said second projections are triangular.

5. The linkage wear prevention system of claim 1, said first end being adapted to engage and fuse with said second end to close said clip device.

6. The linkage wear prevention system of claim 1, wherein said clip device is comprised of a C-shaped structure.

7. A linkage wear prevention system, comprising:
a linkage, wherein said linkage includes a damaged portion;
a clip device removably secured about said damaged portion of said linkage, said clip device including a first end and a second end, said first end and said second end defining a slot therebetween, wherein said clip device is comprised of a malleable metal;
a plurality of first projections positioned on said first end of said clip device, said first projections defining a plurality of first indentations;
a plurality of second projections positioned on said second end of said clip device, said second projections defining a plurality of second indentations; and
a tightening device for tightening said clip device around said linkage.

8. The linkage wear prevention system of claim 7, further comprising a channel extending through said clip device.

9. The linkage wear prevention system of claim 7, wherein said first projections and said second projections are triangular.

10. The linkage wear prevention system of claim 7, said first end being adapted to engage and fuse with said second end to close said clip device.

11. The linkage wear prevention system of claim 7, wherein said clip device is comprised of a C-shaped structure.

12. The linkage wear prevention system of claim 7, wherein said linkage is comprised of a chain.

* * * * *